US006470830B2

(12) United States Patent
Mann

(10) Patent No.: US 6,470,830 B2
(45) Date of Patent: Oct. 29, 2002

(54) PET TOY

(75) Inventor: Charles D. Mann, 1513 E. Burnsville Pkwy., Burnsville, MN (US) 55337

(73) Assignee: Charles D. Mann, Burnsville, MN (US)

( * ) Notice: Subject to any disclaimer, the term of this patent is extended or adjusted under 35 U.S.C. 154(b) by 0 days.

(21) Appl. No.: 09/781,205

(22) Filed: Feb. 12, 2001

(65) Prior Publication Data

US 2001/0008125 A1 Jul. 19, 2001

Related U.S. Application Data

(63) Continuation-in-part of application No. PCT/US99/17024, filed on Jul. 28, 1999
(60) Provisional application No. 60/115,837, filed on Jan. 14, 1999.

(51) Int. Cl.[7] .............................................. A01K 29/00
(52) U.S. Cl. ...................................................... 119/709
(58) Field of Search ................................. 119/710, 709, 119/711, 51.03

(56) References Cited

U.S. PATENT DOCUMENTS

| 1,006,182 A | 10/1911 | Cousin |
| 1,022,112 A | 4/1912 | Smith |
| 1,031,095 A | 7/1912 | Smith |
| 1,149,170 A | 8/1915 | Allis |
| 1,483,165 A | 2/1924 | Eaton |
| 1,534,964 A | 4/1925 | Kahnweiler |
| 1,843,864 A | 2/1932 | Burnett |
| 2,086,631 A | 7/1937 | Munro ......................... 272/86 |
| 2,194,736 A | 3/1940 | Bruler ......................... 272/86 |
| 2,610,851 A | 9/1952 | Jones ............................. 272/8 |
| D188,179 S | 6/1960 | Tay ............................... D12/2 |
| 3,071,476 A | 1/1963 | Werft et al. |
| 3,104,648 A | 9/1963 | Fisher ........................ 119/29 |
| 3,107,651 A | 10/1963 | Beck .......................... 119/29 |

(List continued on next page.)

FOREIGN PATENT DOCUMENTS

| CA | 2240524 | 6/1997 |
| WO | WO 99/25183 | 5/1999 |

OTHER PUBLICATIONS

"Kitt'N Gym" Advertisement, circa 1989.
"Learn & Listen" Advertisement, circa 1990.
"Cat Pursuit Game" Advertisement, circa 1990.
"Dog Play Toy" Advertisement, circa 1990.
Fritz Cat Toys Advertisement, circa 1992.
"Kong Stuffing" Advertisement, *Pet Business Magazine*, May 1995.
Receipe for the Perfect Dog, Kong Company brochure, 1997.
"Biscuit Ball" Advertisement, Pet Business, Oct. 1998.

*Primary Examiner*—Thomas Price
(74) *Attorney, Agent, or Firm*—Robert M. Angus; Westman, Champlin & Kelly, P.A.

(57) ABSTRACT

A non-consumable pet toy comprises a three-dimensional body formed of resilient material with a trapper cavity or slot that has opposing walls extending into the body. In some embodiments, the opposing walls of the trapper cavity are designed to clamp against a substantial portion of opposite surfaces of an attractant, to retain the attractant in the trapper cavity. At least one wall of the trapper cavity is a bias wall that is sufficiently resilient to permit opening the trapper cavity to insert the attractant into the cavity. In some embodiments, the bias wall is a wall of the body of the toy, whereas in other embodiments the bias wall is formed by an adjacent bias cavity in the body spaced from the trapper cavity. In yet other embodiments, a resilient member at least partially closes the trapper cavity to retain small pieces of the attractant as the animal breaks it.

17 Claims, 15 Drawing Sheets

U.S. PATENT DOCUMENTS

| | | | |
|---|---|---|---|
| 3,122,129 A | 2/1964 | Wise | 119/51 |
| 3,664,303 A | 5/1972 | Baensch | 119/51 |
| 3,785,347 A | 1/1974 | Dinnerstein | 119/29 |
| 3,871,334 A | 3/1975 | Axelrod | 119/29.5 |
| 3,899,607 A | 8/1975 | Miller et al. | 426/285 |
| 3,964,438 A | 6/1976 | Rodemeyer | 426/132 |
| 4,032,665 A | 6/1977 | Miller et al. | 426/104 |
| 4,513,014 A | 4/1985 | Edwards | 426/132 |
| 4,557,219 A | 12/1985 | Edwards | 119/29.5 |
| D287,988 S | 1/1987 | Billinghurst | D21/204 |
| 4,802,444 A | 2/1989 | Markham et al. | 119/29 |
| D307,339 S | 4/1990 | Markham et al. | D30/160 |
| 4,919,083 A | 4/1990 | Axelrod | 119/29 |
| D308,122 S | 5/1990 | Markham et al. | D30/160 |
| D314,455 S | 2/1991 | Morton | D30/160 |
| 5,025,753 A | 6/1991 | Schneider | 119/51.03 |
| 5,123,378 A | 6/1992 | Bayne | 119/29 |
| 5,165,363 A | 11/1992 | McGinty | 119/18 |
| RE34,352 E | 8/1993 | Markham et al. | 119/710 |
| 5,232,130 A | 8/1993 | Woodard | 222/464 |
| 5,263,436 A | 11/1993 | Axelrod | 119/710 |
| D343,262 S | 1/1994 | Axelrod | D30/160 |
| D344,161 S | 2/1994 | Markham | D30/160 |
| D349,786 S | 8/1994 | Markham | D30/160 |
| 5,343,828 A | 9/1994 | Houghton et al. | 119/51.03 |
| 5,351,652 A | 10/1994 | Budman et al. | 119/711 |
| D357,952 S | 5/1995 | Chen | D21/191 |
| D359,147 S | 6/1995 | Hotta et al. | D30/160 |
| 5,536,007 A | 7/1996 | Snyder | 273/118 R |
| D373,229 S | 8/1996 | O'Rourke et al. | D30/160 |
| D373,859 S | 9/1996 | Markham et al. | D30/160 |
| 5,553,570 A | 9/1996 | VanNatter, III et al. | 119/709 |
| 5,595,142 A | 1/1997 | Chill | 119/710 |
| 5,619,954 A | 4/1997 | Rotondi | 119/707 |
| 5,640,931 A | 6/1997 | Markham | 119/711 |
| D387,513 S | 12/1997 | Mauldin, Jr. | D30/160 |
| D388,559 S | 12/1997 | Mauldin, Jr. | D30/160 |
| D393,110 S | 3/1998 | Mauldin, Jr. | D30/160 |
| 5,799,616 A | 9/1998 | McClung, III | 119/709 |
| 5,813,366 A | 9/1998 | Mauldin, Jr. | 119/710 |
| 5,832,877 A | 11/1998 | Markham | 119/710 |
| 5,857,431 A | 1/1999 | Peterson | 119/710 |
| 5,865,146 A | 2/1999 | Markham | 119/707 |
| 5,904,118 A | 5/1999 | Markham | 119/707 |
| 5,947,061 A | 9/1999 | Markham et al. | 119/710 |
| 5,965,182 A | 10/1999 | Lindgren | 426/104 |
| 6,129,053 A | 10/2000 | Markham et al. | 119/710 |

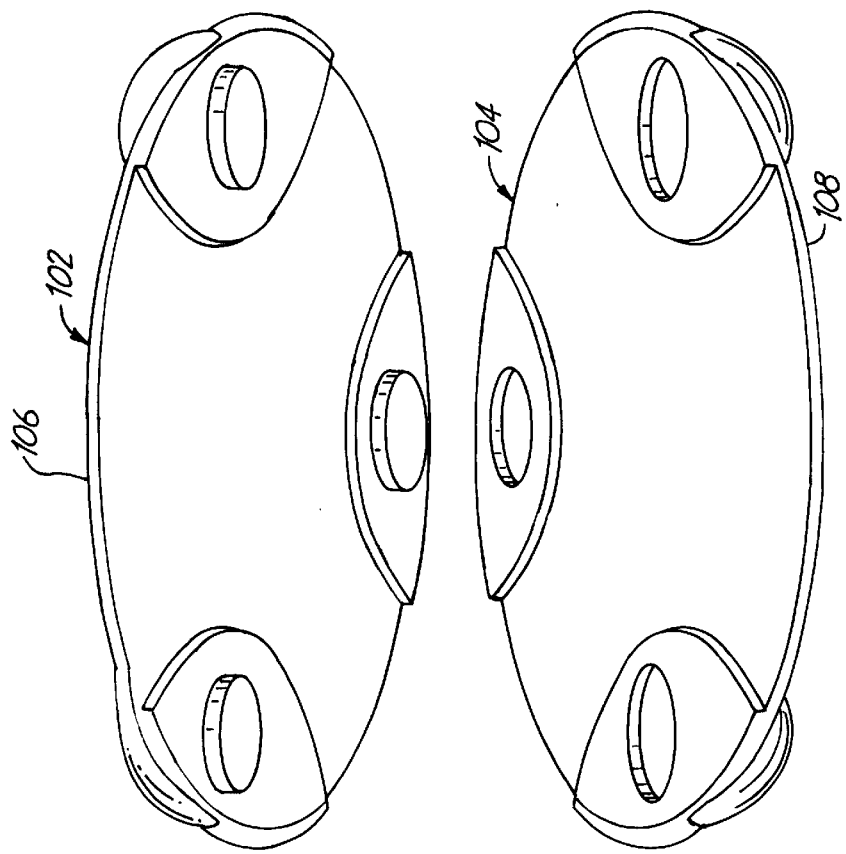
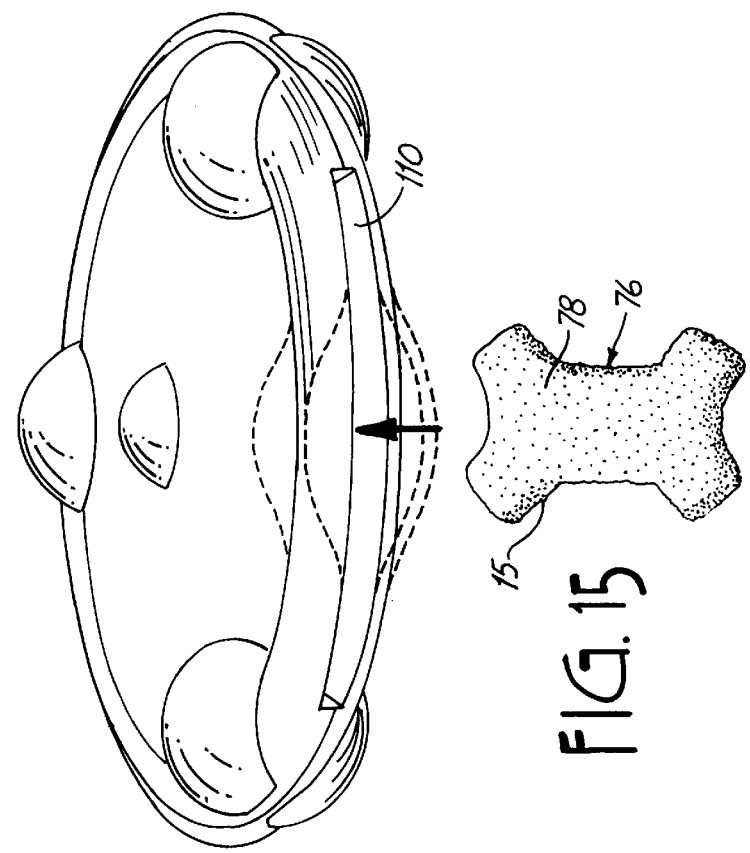

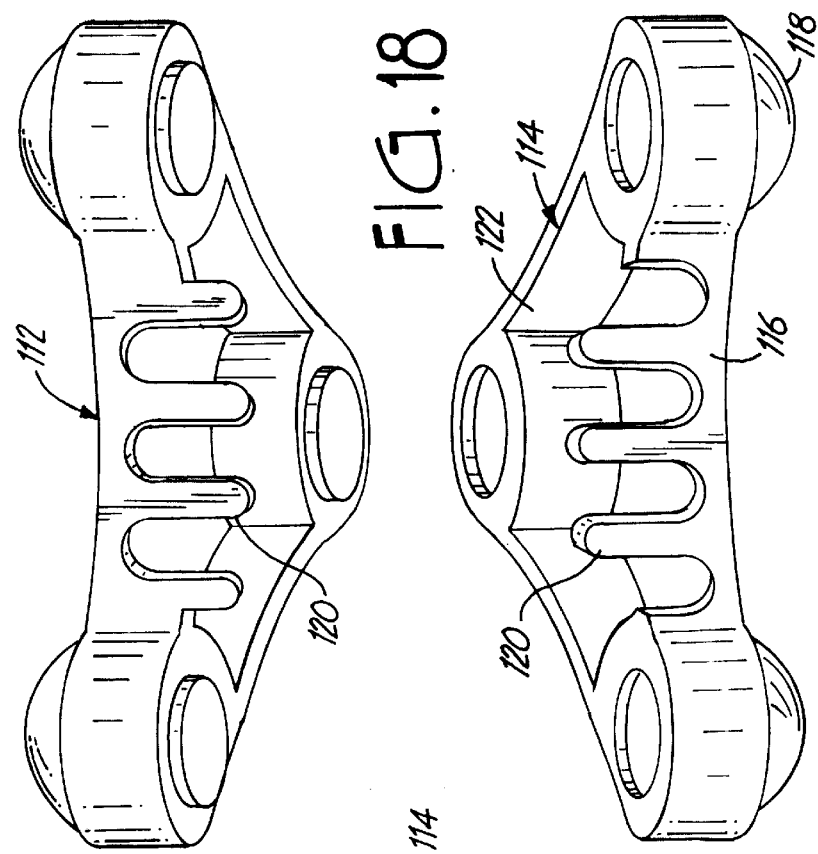
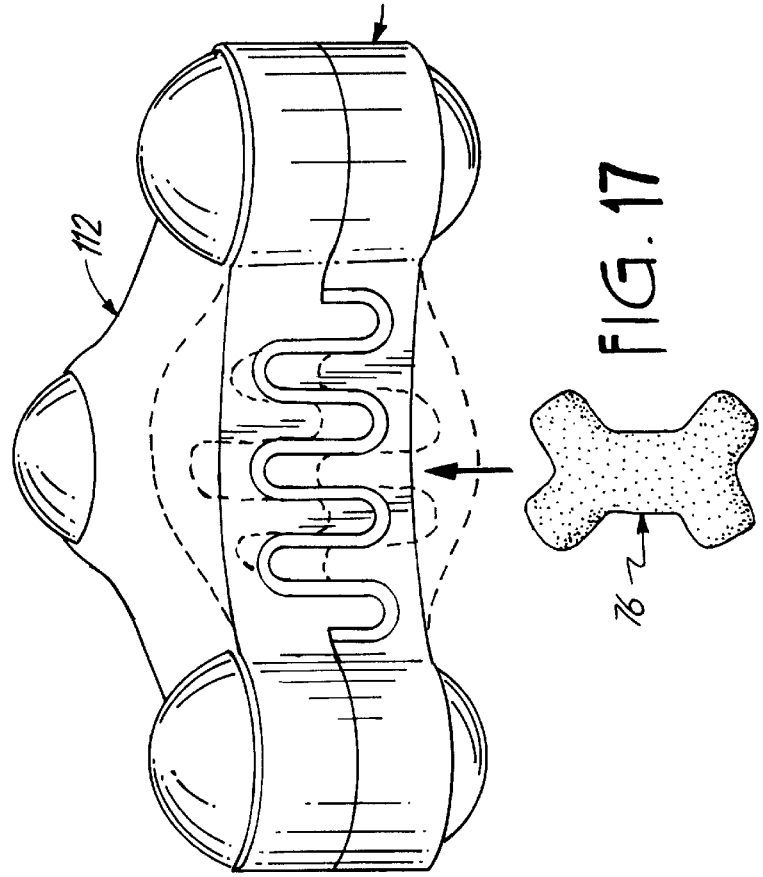

PET TOY

CROSS-REFERENCE TO RELATED APPLICATION

This application is a continuation-in-part and claims priority of International Application No. PCT/US99/17024 filed Jul. 28, 1999, published in English, which in turn claims priority of U.S. Provisional Application No. 60/115,837 filed Jan. 14, 1999.

BACKGROUND OF THE INVENTION

This invention relates to pet toys, and particularly to toys for carnivorous animals such as dogs and cats.

Chewable pet toys provide a variety of beneficial functions for the pet carnivore. Chewing on such toys provides the carnivore with masticatory exercise, as well as dental prophylaxis. Irregular shapes impart erratic movements to the toy when rolled or bounced, thereby provide exercise for the animal. Such toys often provide a training function, teaching the carnivore to chew on the toy, rather than on furniture or other valuable items.

To enhance the attractiveness of the toy to the carnivore, sensory attractants have been incorporated in the toy. These toys attract the carnivore and encourage the carnivore to chew on the toy, rather than on furniture or other personal property. Thus, the sensory attractant is particularly advantageous as a training device for the carnivore. Often, these sensory attractants are an integral part of the toy, molded into the plastic or other material of the toy, making it impossible to remove the attractant without destroying the toy. More recent toys employ a cavity designed to retain a replaceable attractant.

One example of a toy designed to retain replaceable attractants is the "Kong" toy available from the Bounce, Inc. of Golden, Colo. This toy, described in U.S. Pat. No. 4,802,444 has a hollow cavity in which the attractant is loosely retained until dislodged by the animal. The cavity is open at an end to permit insertion of the attractant, such as a dog biscuit or other treat. The toy is constructed of resilient plastic, such as a non-toxic elastomer, so that the cavity is resiliently crushed by the chewing action of the animal, thereby breaking the attractant. This allows the animal to crush the attractant and dissolve it with the animal's saliva so that part of the attractant is expelled through the opening to the animal. When the attractant is fully removed by the animal, the pet owner may replace the attractant so that the toy may be reused. However, the attractant was loosely placed within the cavity of the toy, rendering it relatively easy to retrieve from the toy's cavity. Consequently, the animal quickly lost interest in the toy.

Another chew toy from Bounce, Inc., called Biscuit Ball, is described in U.S. Pat. No. 5,947,061. This toy employs a hollow cavity formed by a wall having openings that retain treats, such as biscuits. A small portion of the biscuit is held by the lip of the opening, allowing the animal to break the biscuit so that one portion is immediately retrieved and the other portion falls loose inside the toy where it can be quickly dislodged and retrieved by the animal. Thus, like the Kong toy, the Biscuit Ball toy did not retain the animal's interest for any great period of time.

A toy available from Planet Pet, Inc. of Naples, Fla., is described in U.S. Pat. No. 5,813,366 to Mauldin. The Planet Pet toy employs splines within a treat-receiving shaft. The splines bend to grip the attractant over a substantial portion of the surface of the attractant to rigidly hold the attractant until dissolved or chewed to a reduced size by the animal. Thus, the Planet Pet toy overcame a significant problem of the Kong and Biscuit Ball toys by gripping a substantial surface area of the attractant by the splines, so that even if the animal broke off one portion, another portion was retained. Thus, when so used, the toy held the interest of the animal for a substantial length of time. However, the attractant was inserted into the Planet Pet toy by simultaneously rotating the attractant to bend the splines and pushing on the attractant to force the attractant into the attractant-receiving shaft. The shear strength of many attractants, such as dog biscuits, is inadequate to overcome the reaction force of the splines. Consequently, the attractant broke into smaller pieces during insertion, making them easier to remove by the animal. In some cases, the attractant crumbled into such small pieces that they could not be gripped by the splines, rendering the toy relatively useless as a sensory attractant holder.

Mann Design introduced another toy, described in the aforementioned International Application No. PCT/US99/17024, that overcame many of the difficulties of the Kong, Biscuit Ball and Planet Pet toys. The Mann Design toy employed a solid body having a trapper cavity extending through the toy and an adjacent bias cavity that provided independent flexibility to a bias wall of the trapper cavity. Attractants, such as dog biscuits, could be easily inserted into the trapper cavity by deforming the bias wall into the bias cavity. Upon release of the deforming force, a substantial portion of the surface area of the attractant was clamped between the opposing walls of the trapper cavity. Hence, the Mann Design toy provided easy replacement of the attractant, while holding the interest of the animal for a substantial period of time.

Most pet toys are used by animal handlers and owners to encourage social interaction between the handler and the animal. Hence, commercially successful pet toys are attractive to the owner or handler, are easy to use, and retain the interest of the animal for a considerable period of time. Most pet owners and handlers purchase pet toys that have multiple attractive appendages and/or multiple colors. Toys made from a single mold are limited in shapes and colors. Consequently, solid toys, such as the aforementioned Planet Pet and Mann Design toys cannot be made in shapes having multiple appendages and cannot be made in multiple solid colors. Instead, molded toys having multiple aesthetic appendages and/or multiple solid colors are made by forming several parts of the toy in separate molds, and fixing the several parts together with an adherent.

BRIEF SUMMARY OF THE INVENTION

The present invention is directed to a non-consumable pet toy for rigidly holding a replaceable sensory attractant, such as a dog biscuit or other treat, wherein the attractant is held by the toy over a substantial portion of its surface so is cannot be quickly broken or dislodged, and wherein the attractant is not subjected to shear forces that could break the attractant during insertion into the toy.

In one form of the invention, the toy includes a trapper cavity having opposing surfaces that extend a substantial distance into the toy to apply a compressive force against a substantial portion of the surface of the attractant, such as a biscuit in the cavity. At least one of the opposing surfaces is on a bias wall that is sufficiently resilient that a deformation force applied to the toy deforms the bias wall to expand the trapper cavity and permit insertion of the attractant. In some embodiments, flexibility of the bias of the trapper cavity is achieved by a bias cavity such that the bias wall is between the bias cavity and the trapper cavity and is designed to distort into the bias cavity during insertion of the attractant. In other embodiments, flexibility of the bias wall is achieved by placing the trapper cavity sufficiently close to the outer surface of the toy to form the bias wall between the outer surface and the trapper cavity so that the bias wall may distort the external surface of the toy during insertion of the attractant.

In another form of the invention, the toy includes a trapper cavity that receives the attractant and whose opening is closed by resilient teeth that permit easy insertion of the attractant into the trapper cavity. The teeth mesh so that small pieces of the attractant that might be broken by the animal are retained in the trapper cavity. As the animal salivates, small pieces of the attractant dissolve and flow through the teeth for access by the animal.

In all embodiments of the invention, the toy optionally includes an external configuration that promotes erratic motion of the toy, thereby holding the interest of the animal.

BRIEF DESCRIPTION OF THE DRAWINGS

FIGS. 15 and 16 are a side view and assembly view, respectively, of a eighth embodiment of the present invention.

FIGS. 17 and 18 are a side view and assembly view, respectively, of a ninth embodiment of the present invention.

DETAILED DESCRIPTION

Figure 1:
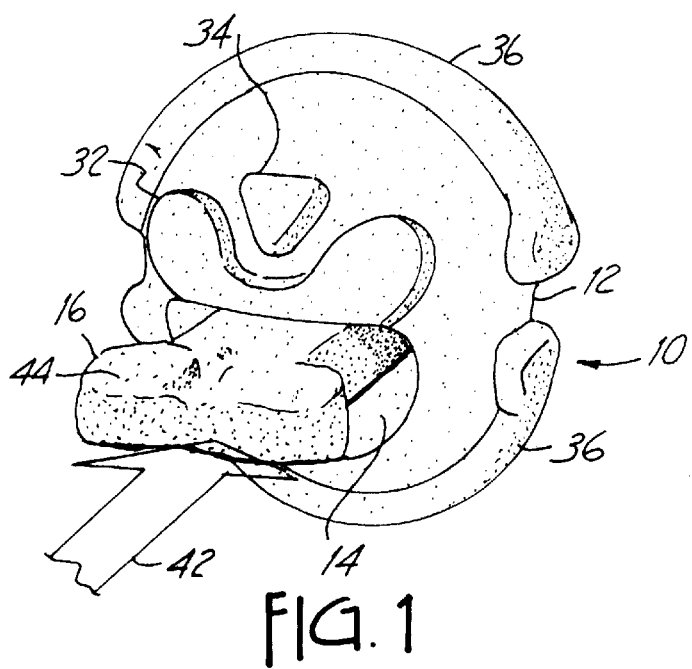
FIG. 1 is a perspective view of a pet toy in accordance with a first embodiment of the present invention showing an attractant held by the toy.

Most animal attractants, such as dog biscuits and the like, have relatively low shear strengths. Such attractants cannot support shear loads and therefore cannot be easily twisted into a pet toy as described in the aforementioned Mauldin patent without breaking. Nevertheless, such attractants often have relatively high compression strengths, such that they can support compression loads. The present invention takes advantage of the relatively high compressive strength of the attractant and is particularly directed to a pet toy wherein the attractant is inserted under a compression force, and is held by the toy under a compression force.

FIGS. 1–4 illustrate a pet toy 10 in accordance with a first embodiment of the present invention. Toy 10 has a generally circular body 12 constructed of a non-consumable, resilient or flexible material, such as a non-toxic elastomer or neoprene plastic. Those skilled in the art will appreciate that the toy illustrated in FIGS. 1–4 can be molded in a single mold, which, when opened, produces the toy. Trapper cavity 14 extends through body 20 and is open at each end thereof to accept a sensory attractant 16 (FIG. 1) to be held within trapper cavity 14. Trapper cavity 14 has opposing walls 18 and 20 that spaced apart by distance smaller than the thickness of sensory attractant 16 when the body of the toy is a relaxed condition. End portions 22 and 24 form terminations for walls 18 and 20 terminate at opposite sides of cavity 14 across the width of the cavity; end portions 22 and 24 extending somewhat away from wall 18 as shown to define a neck portion between walls 18 and 20. Thus, trapper cavity 14 is generally in the shape of a half-bone with a narrow neck portion between walls 18 and 20.

A bias cavity 26 in the form of an aperture extends through body 12 parallel to axis 28 of trapper cavity 14. Aperture 26 forms a bias member 30 in the form of a continuous bridge between aperture 26 and trapper cavity 14. In preferred embodiments, the bridge extends adjacent the neck between walls 18 and 20, as well as adjacent one side of enlarged end portions 22 and 24.

Protrusion 32, generally in the shape of a half-bone similar to trapper cavity 24, is formed on opposite surfaces of body 12 adjacent the openings of the longer wall 18 of the trapper cavity. Protrusion 34, generally in the shape of bias aperture 26, is formed on opposite surfaces of body 12 to provide symmetry to the bias aperture. Protrusions 32 and 34 are provided for aesthetic purposes and to aid in imparting erratic movements to the toy when rolled or bounced. A pair of protrusions 36 are formed about the periphery of the body, each in the shape of a bone, encircling the openings of cavity 14, again enhancing the aesthetics of the toy, as well as providing an irregular shape to the toy to impart erratic movements of the toy when rolled or bounced.

Figure 2:
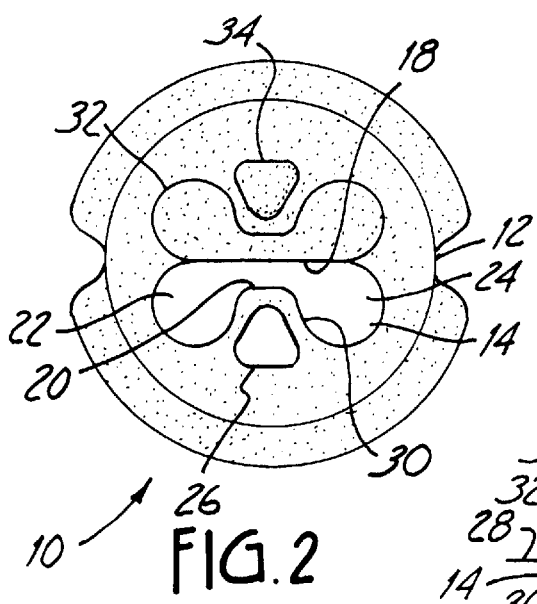
FIGS. 2 and 3 are front and section views, respectively of the pet toy illustrated in FIG. 1.
Figure 4:
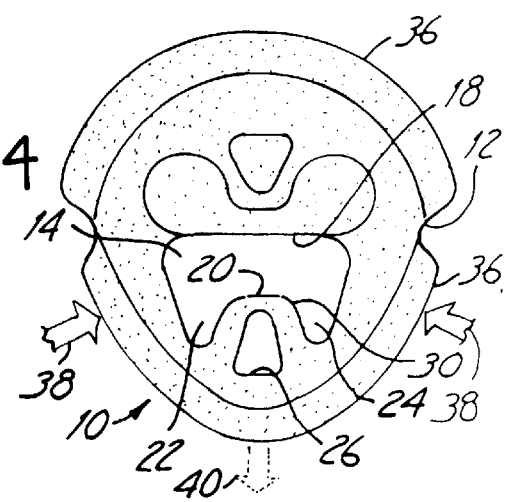
FIG. 4 is a frontal view as in FIG. 2, illustrating the application of force and distortion of the toy to permit insertion of an attractant into the trapper cavity.
Figure 3:
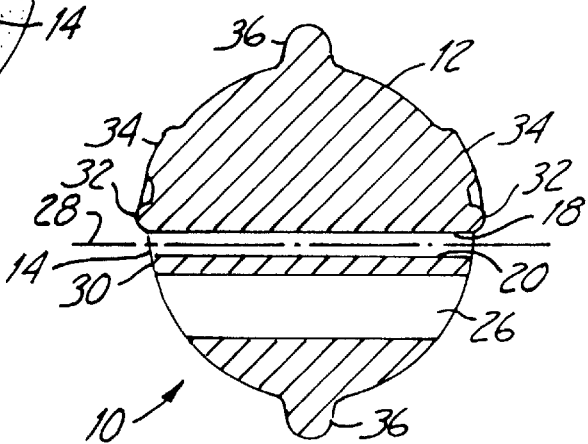

Insertion of sensory attractant 16 into the trapper cavity of the toy may best be explained with particular reference to FIGS. 1, 2 and 4. FIG. 2 is a frontal view of the toy in a relaxed condition, without an attractant in cavity 14. A force applied to the body of the relaxed toy in the direction of arrows 38 (FIG. 4), such as by squeezing between the thumb and fingers of one hand of the pet master. The force deforms body 12 and trapper cavity 14 in the direction of arrow 40, thereby increasing the space between walls 18 and 20 of trapper cavity 14 and decreasing the width of the cavity. Enlarged portions 22 and 24 also deform as shown, making easy the insertion of attractant 16. Attractant 16 is then inserted into the opened cavity and urged by hand in the direction of arrow 42 (FIG. 1) axially into cavity 14. With the attractant fully inserted in cavity 14, the force of arrows 38 is released, allowing the body of the toy to relax, resulting in walls 18 and 20 compressing against external surfaces 44 of the attractant, retaining the attractant under the compressive force of the relaxed body. Thus, the body is sufficiently flexible to permit compression along the width of cavity 14 and expansion across cavity 14 to permit easy insertion of the attractant.

Although cavity 14 has been described as half-bone shaped for aesthetic reasons, the enlarged end portions of the cavity cooperate with bias aperture 26 to ease the deformation of the toy for insertion of the attractant. The bias aperture serves to bias bridge 30 against the attractant to retain the attractant in the cavity.

In use, the carnivore chews on the toy in an attempt to loosen and obtain the attractant, thus providing the carnivore with masticatory exercise, as well as dental prophylaxis. The inclusion of the sensory attractant is particularly advantageous as a training device, encouraging the carnivore to chew on the toy, rather than on furniture or other valuable items. Should the animal push or bounce the toy, protrusions 36 assure an erratic movement to the toy upon bouncing or rolling thereby providing exercise for the animal.

Figure 5:
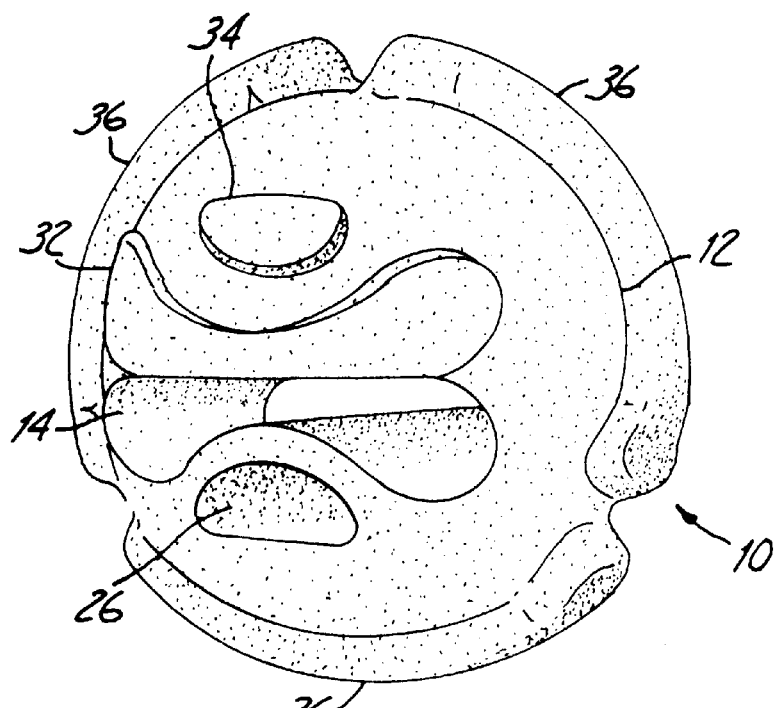
FIGS. 5 and 6 are a perspective and frontal views of a pet toy in accordance with a second embodiment of the present invention.
Figure 6:
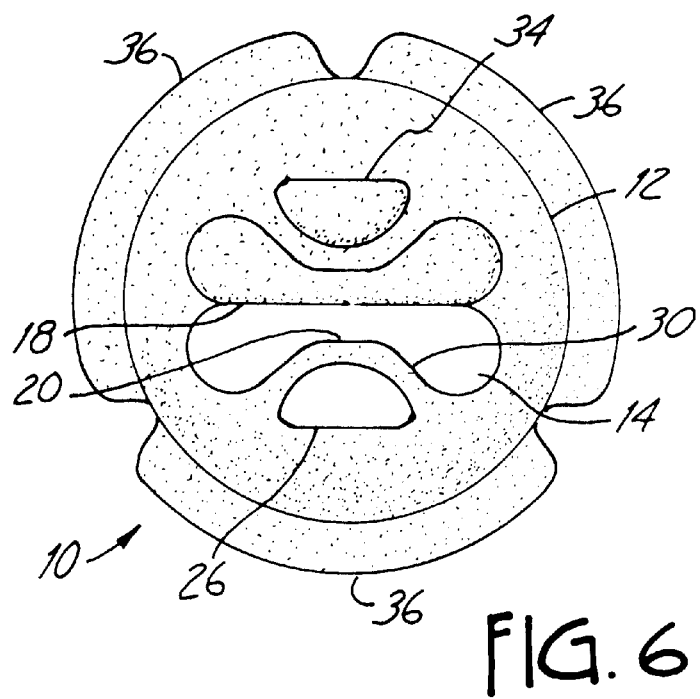

FIGS. 5 and 6 illustrate a second embodiment of the invention where, instead of two protrusions 36, there are three, and the diameter of body 12 is larger than in FIGS. 1–4. The embodiment of FIGS. 5 and 6 can also be manufactured in a single mold, and is particularly suitable for medium-sized animals, whereas the embodiment illustrated in FIGS. 1–4 is more suited for small animals.

Figure 7:
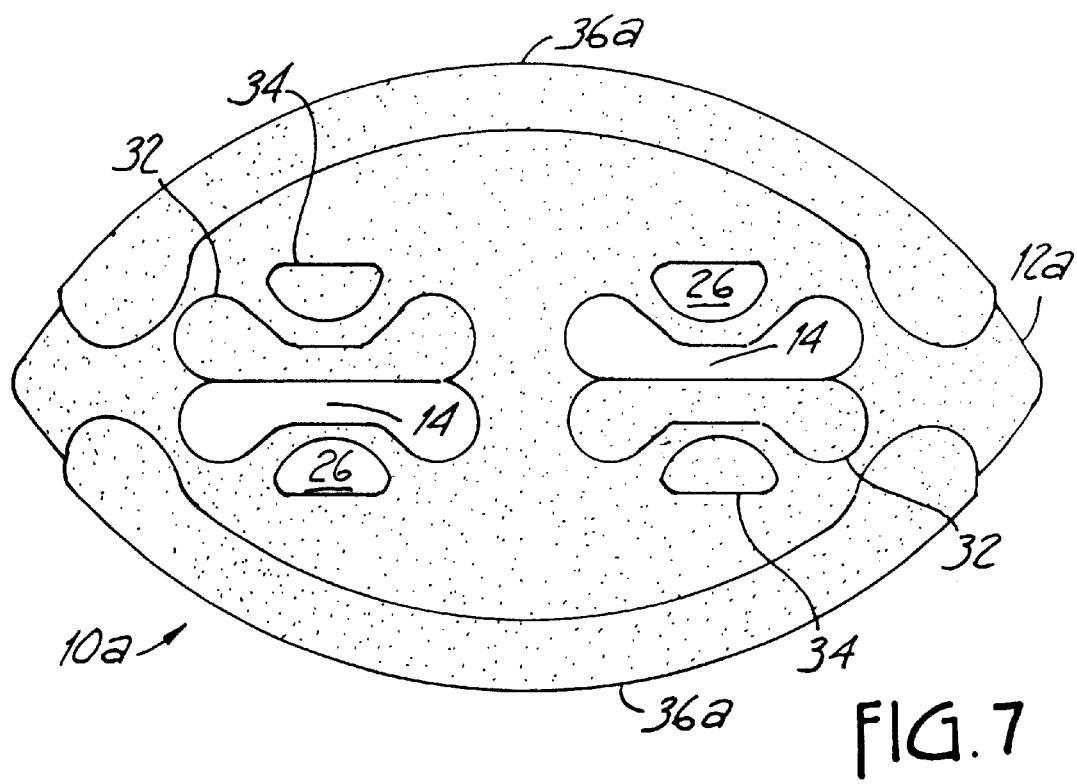
FIGS. 7 and 8 are frontal and top views of a pet toy in accordance with a third embodiment of the present invention.
Figure 8:
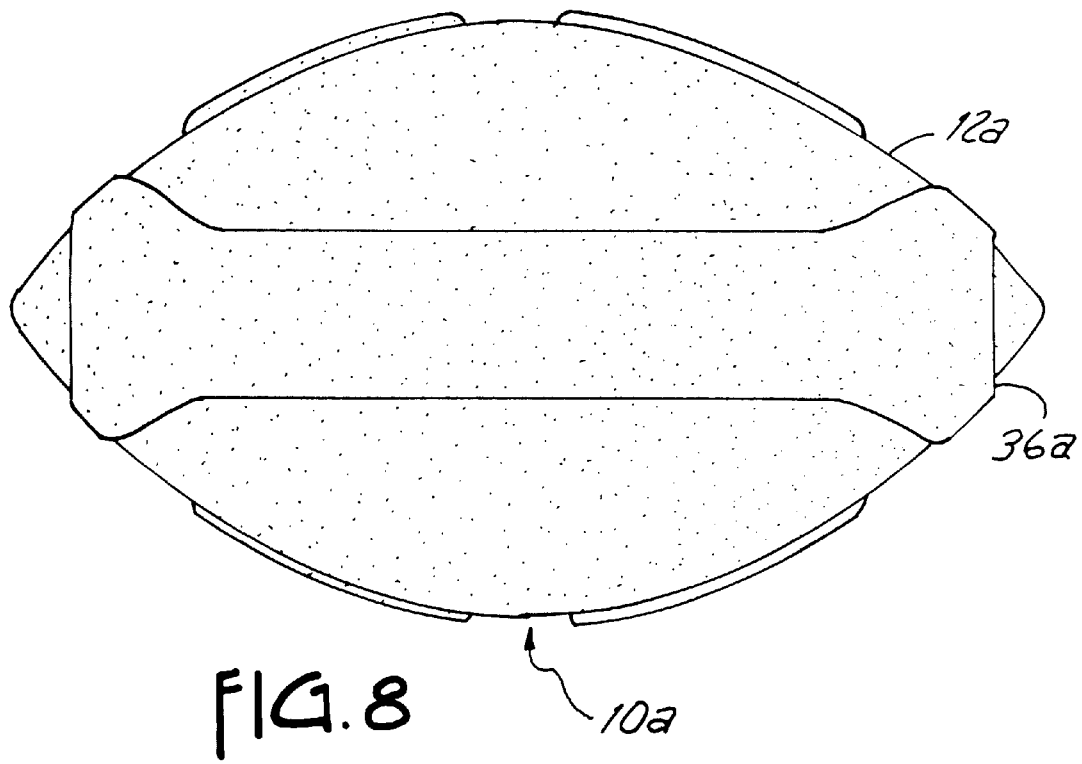

FIGS. 7 and 8 illustrate a third embodiment of the present invention, particularly suitable for large size animals, in which the body 12a is more elongated, shaped like a North American football. Protrusions 36a, again shaped somewhat like dog bones, extend along the length of the body 12a and encircle the pair of trapper cavities 14 that extend through the body as illustrated in the previous embodiments. Complementary to each trapper cavity 14 and bias aperture 26 is a protrusion 32 and 34, as in the previous embodiments. As shown particularly in FIG. 7, the two trapper cavities 14 may be on opposite sides of the center axis of body 12a. Alternatively, they may be on the same side. Like the earlier embodiments, this embodiment can be manufactured by a single mold process.

Figure 9:
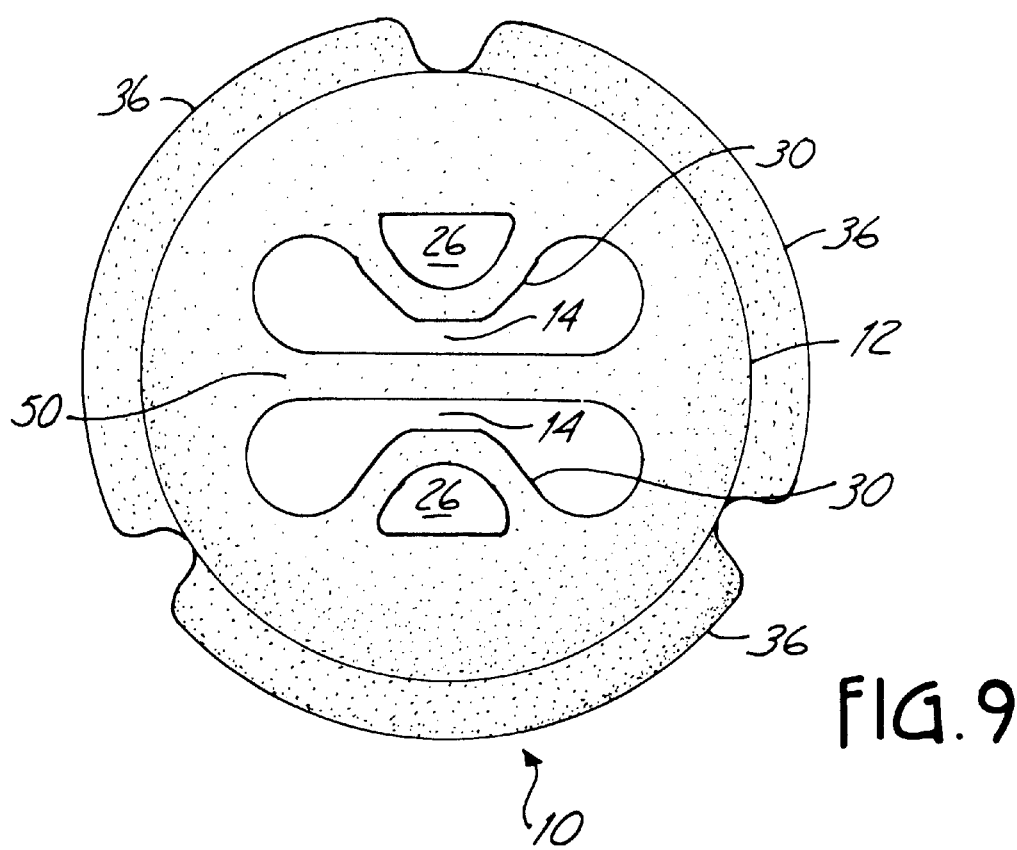
FIG. 9 is a frontal view of a pet toy in accordance with a fourth embodiment of the present invention.

FIG. 9 illustrates a fourth embodiment of the present invention, similar to the embodiment illustrated in FIGS. 5 and 6, except that instead of protrusions 32 and 34, a second trapper cavity 14 and bias aperture 26 complements the first set. Thus, in the embodiment illustrated in FIG. 9, there are two complementary trapper cavities 14 and corresponding bias apertures 26. As in the previous embodiments, bias bridge 30 separates the respective bias aperture from the respective trapper cavity. Additionally, an elongated bias bridge 50 is formed between the two bias cavities 14, bias bridge 50 also being deformable into one of the trapper cavities upon insertion of a sensory attractant into the other. Thus, where an attractant is to be inserted into one of the trapper cavities 14, the associated bias bridge 30 deforms into the associated bias aperture 26 as previously described, and bias bridge 50 deforms into the other trapper cavity 14, permitting insertion of the sensory attractant into the one trapper cavity.

Figure 10:
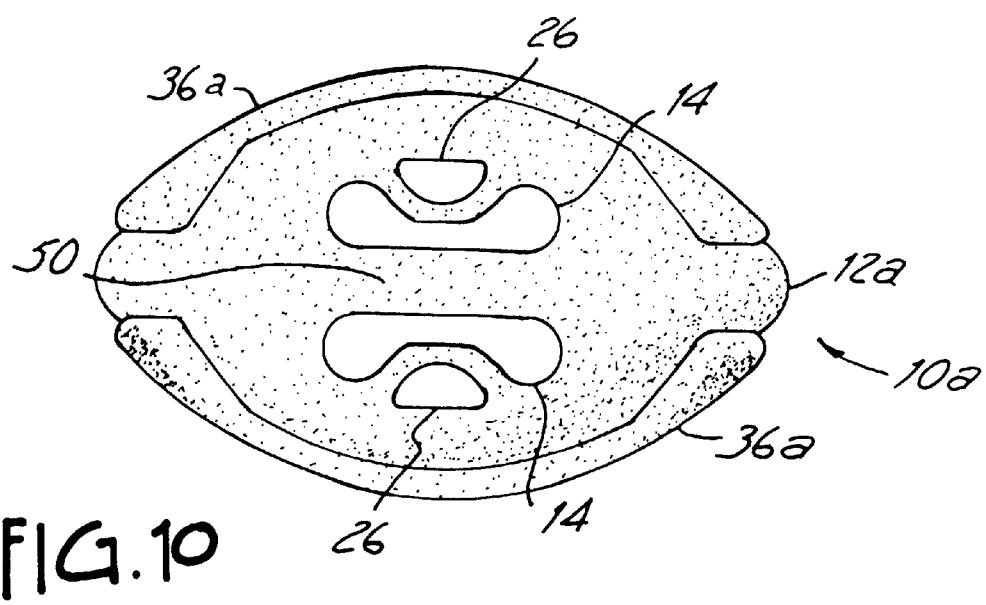
FIG. 10 is a frontal view of a pet toy in accordance with a fifth embodiment of the present invention.

FIG. 10 illustrates a fifth embodiment of the present invention, similar to that illustrated in FIGS. 7 and 8, except that a pair of complementary trapper cavities 14 and bias apertures 26 form a bias bridge 50 in the manner shown in FIG. 9. Like the embodiments of FIGS. 1–8, the embodiments of FIGS. 9 and 10 can be made in a single mold.

Figure 12:
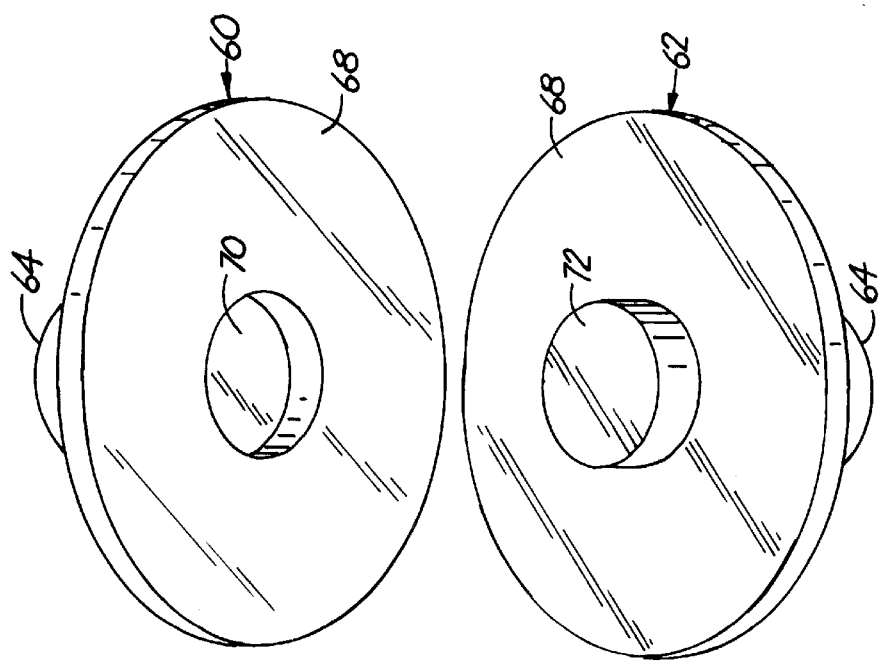
FIGS. 11 and 12 are a side view and assembly view, respectively, of a sixth embodiment of the present invention.
Figure 11:
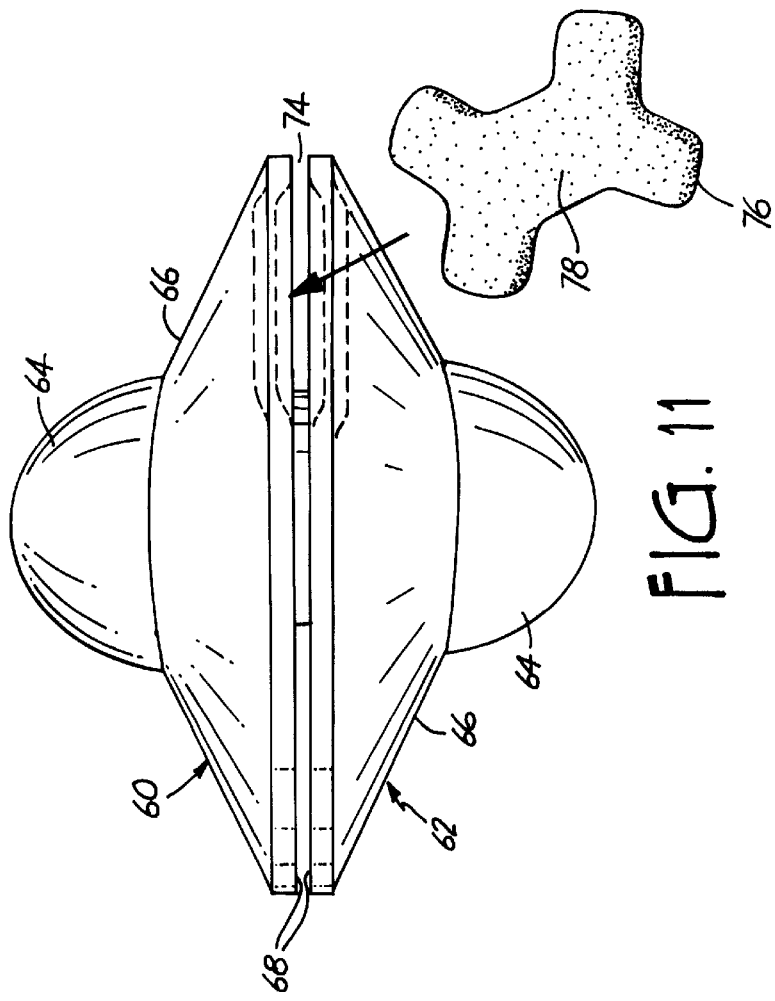

FIGS. 11 and 12 illustrate a sixth embodiment of the present invention. In this case, the toy is constructed by adhering two resilient members 60 and 62 molded from a pair of molds. Each member 60 and 62 has an exterior consisting of a bulbous portion 64 and a frustoconical portion 66 extending from the bulbous portion to the periphery of the member to form a flat circular surface 68. Cavity 70 in surface 68 of member 60 receives cylindrical member 72 extending from surface 68 of member 62. Members 60 and 62 are joined by inserting cylinder 72 into cavity 70 and fastening the members together with a suitable adhesive, well-known in the art. When assembled, an attractant-receiving trapper cavity 74 is formed between surfaces 68 of members 60 and 62. The trapper cavity surrounds member 72 and is adequately deep into the toy that surfaces 68 engage at least one-half, and preferably more, of the length of the attractant. The trapper cavity is open through the entire circular periphery, so one or more attractants, such as biscuits, may be inserted into the trapper cavity from different orientations. When the toy is in its relaxed position, without an attractant in the trapper cavity, the distance between surfaces 68 is less than the thickness of the attractant.

A deforming force may be applied to the toy formed by members 60 and 62 by squeezing the toy radially, causing members 60 and 62 to deform oppositely to enlarge or expand the space between surfaces 68 of trapper cavity 74. Alternatively, the frustoconical portions 66 of members 60 and 62 may simply be spread apart by the user to expand trapper cavity 74. In either case, attractant 76 is inserted into cavity 74 between surfaces 68 so that when the deforming force that opened the cavity is relaxed, opposing surfaces 68 engage opposite surfaces 78 of the attractant in cavity 74 to clamp the attractant in cavity 74 between surfaces 68. While members 60 and 62 are deformable to allow access to the attractant, the frustoconical portions 66 provide an increasing axial thickness to members 60 and 62 to increase resistance to deformation toward the central axis of the toy. As a consequence, the animal must work harder to retrieve portions of the attractant that are closer to the axis than at the outer perimeter of the toy. Consequently, the owner or handler can select a difficulty level for the animal to retrieve the attractant, simply by selective placement of the attractant in cavity 74.

Figure 14:
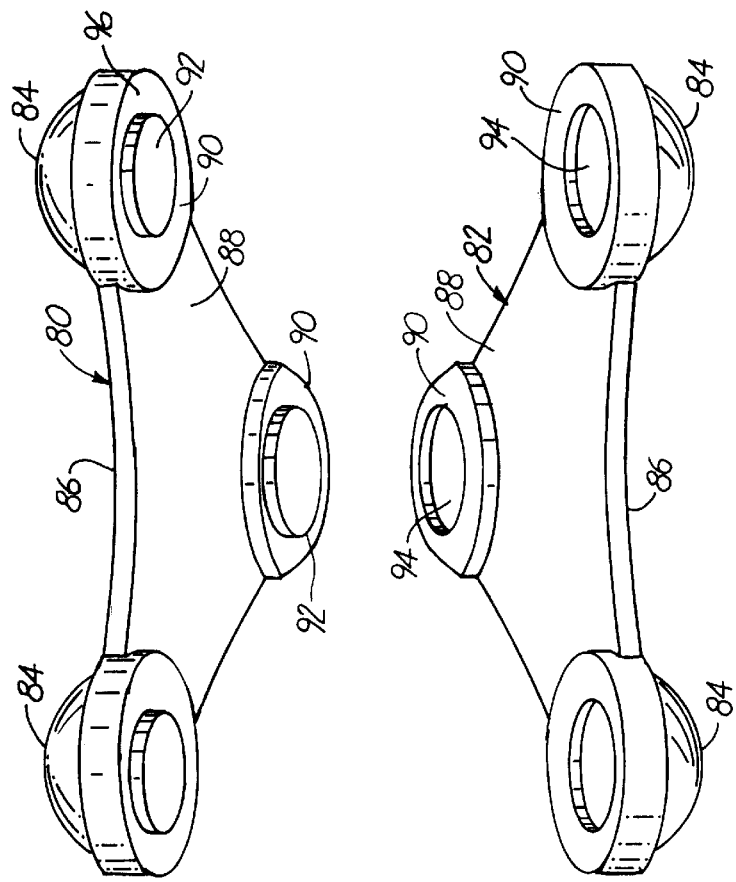
FIGS. 13 and 14 are a side view and assembly view, respectively, of a seventh embodiment of the present invention.
Figure 13:
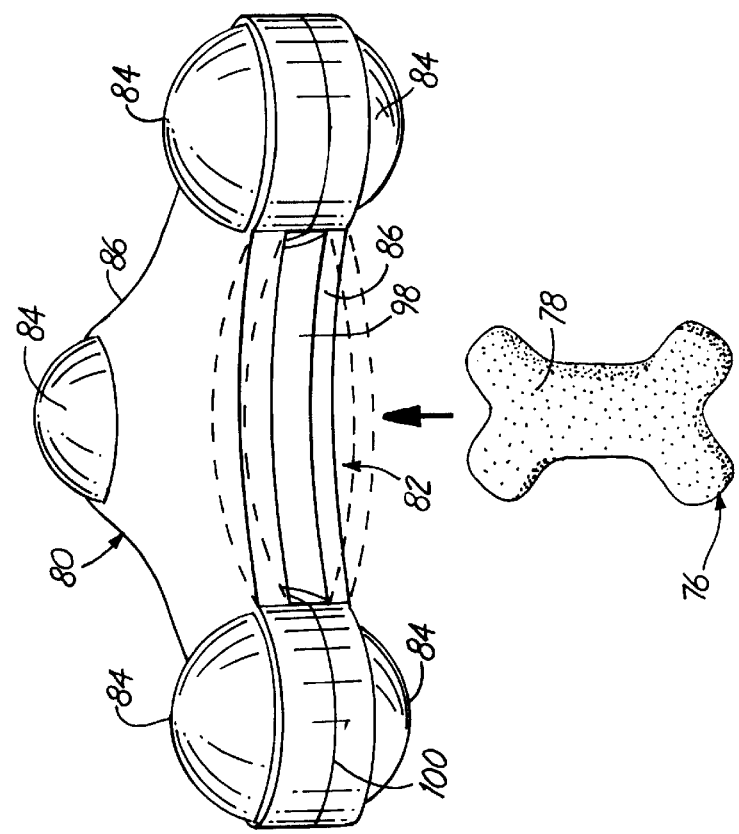
Figure 20:
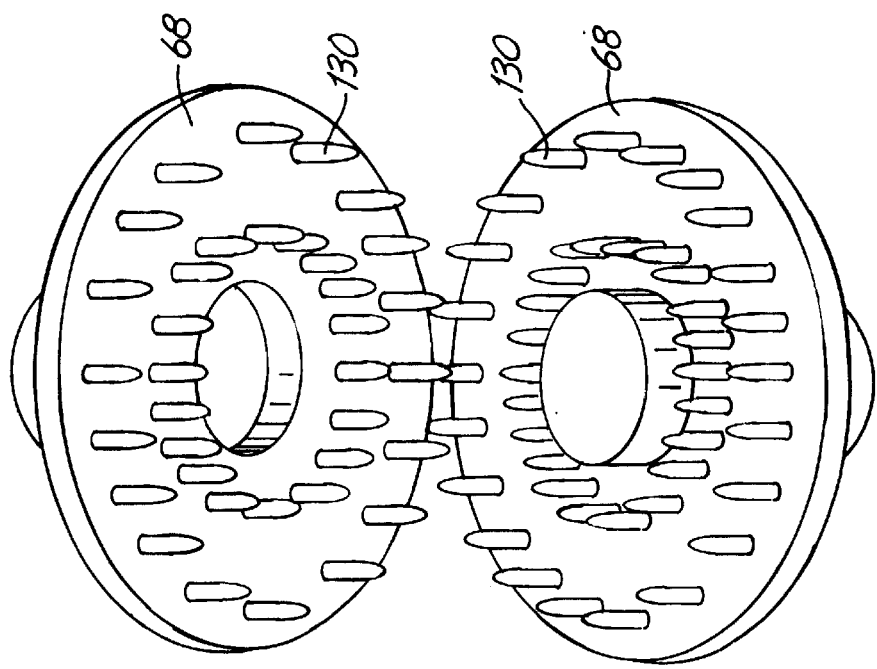
FIGS. 19 and 20 are a side view and assembly view, respectively, of a tenth embodiment of the present invention.
Figure 19:
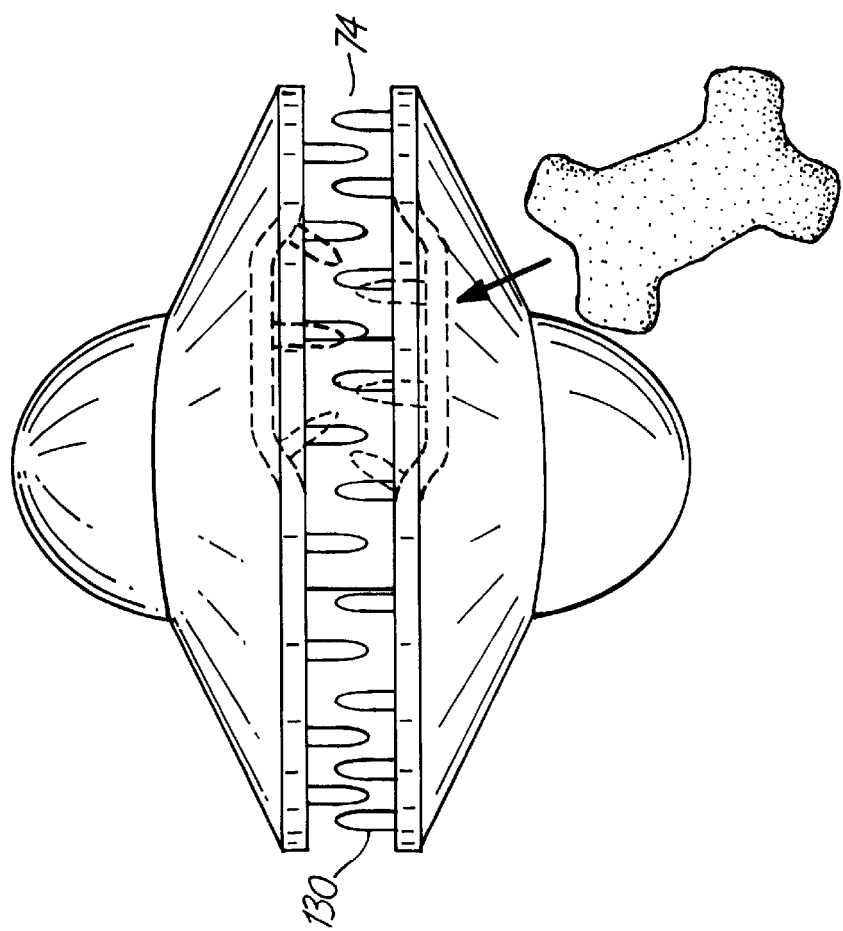
Figure 22:
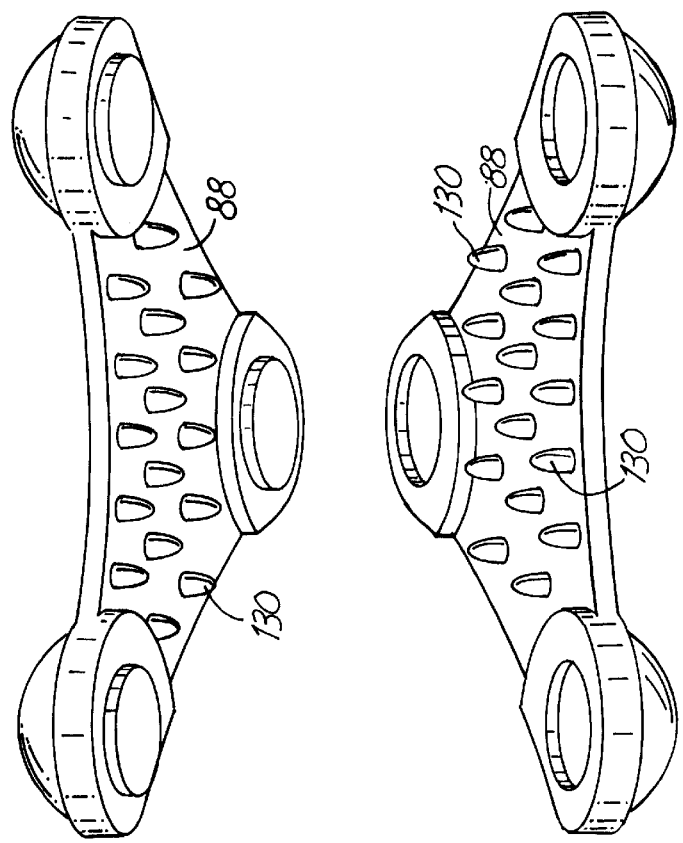
FIGS. 21 and 22 are a side view and assembly view, respectively, of a eleventh embodiment of the present invention.
Figure 21:
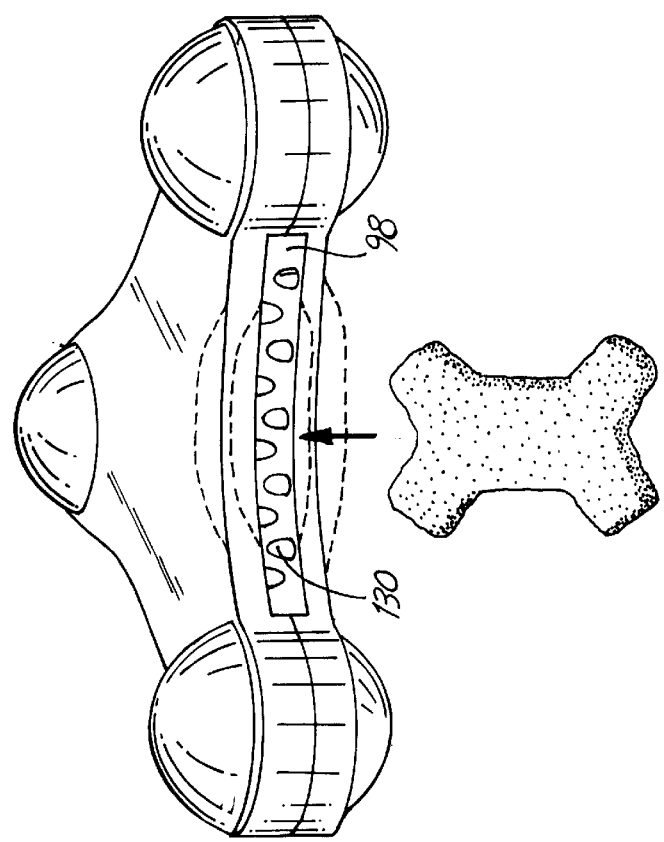

FIGS. 13 and 14 illustrate a seventh embodiment of the present invention. Resilient members 80 and 82 each include plural bulbous portions 84 connected by a wall member 86, having a flat internal surface 88. Raised portions 90 extend from surface 88 of walls 86, aesthetically opposite bulbous portions 84, and cylindrical members 92 extend from members 90 of member 80 to be received in cavities 94 on member 82. Surfaces 96 of members 90 are arranged a predetermined distance from surfaces 88 so that when cylinders 92 are joined into cavities 94, a trapper cavity 98 of predetermined size is formed between surfaces 88 of members 80 and 82. Members 90 and 92 are spaced about the periphery of the toy to generally surround trapper cavity 98 and form plural openings to the trapper cavity from the periphery. The widths of the trapper cavity openings are greater than the width of the attractant, and the depth into the toy is at least one-half the length of the attractant and most conveniently greater than the length of the attractant. An adhesive 100 (FIG. 13) is applied to surfaces 90, cylinders 92 and cavities 94 to fasten the toy together as illustrated in FIG. 13. As in the case of the embodiment of FIGS. 11 and 12, deformation of walls 86 permits insertion of attractant 76 into trapper cavity 98 so that the substantial portion of the surfaces 78 of the attractant are clamped between surfaces 88 to hold the attractant in place. If desired, the attractant, such as a biscuit, may be inserted into an opening toward an opposite member 92 so little or none of the biscuit extends through the opening from the trapper cavity. Alternatively, the biscuit may be inserted so the ends of the biscuit extend through adjacent openings.

FIGS. 15 and 16 illustrate an eighth embodiment of the present invention, similar to that illustrated in FIGS. 13 and 14, except that in this case, resilient members 102 and 104 are substantially circular in shape such that walls 106 and 108 are deformable to allow insertion of attractant 76 into trapper cavity 110 to clamp a substantial portion of the surface 78 of attractant 76 between members 104 and 102.

FIGS. 17 and 18 illustrate a ninth embodiment of the present invention. In this case, the attractant is loosely held in a trapper cavity that is closed with resilient gates. Each member 112 and 114 includes a band 116 extending between bulbous portions 118. The members are fastened together with a suitable adhesive with the cylindrical member and cavity described in the embodiments of FIGS. 11–16. At least one region of band 116 between two of the bulbous portions includes resilient gates 120 that mesh with similar resilient gates on the band on the opposing member to enclose trapper cavity 122, as illustrated in FIG. 17. Attractant 76 is inserted into trapper cavity 122 by deflecting the gates with the attractant and sliding the attractant into the trapper cavity. The attractant is completely retained in trapper cavity 122 formed by bands 116 and closed by gates 120, thereby trapping the attractant in the trapper cavity. As the animal attempts to retrieve the attractant from the toy, saliva from the animal will eventually dissolve the attractant into small pieces allowing the animal to retrieve the attractant pieces as they escape from cavity 122 through gates 120.

FIGS. 19 and 20 and FIGS. 21 and 22 illustrate respective tenth and eleventh embodiments of the present invention similar to those illustrated in FIGS. 11 and 12, and 13 and 14, respectively. These embodiments include additional resilient tines or gripping teeth 130 that extend from the respective surfaces 68 or 88 into trapper cavity 74 or 98, as the case may be, to grip the attractant. In both of these embodiments, the resilient member is deformed, as previously described, so that upon release of the deformation, teeth 130 engage a substantial portion of attractant 76 to hold the attractant in the respective trapper cavity 74 or 98.

Figure 24:
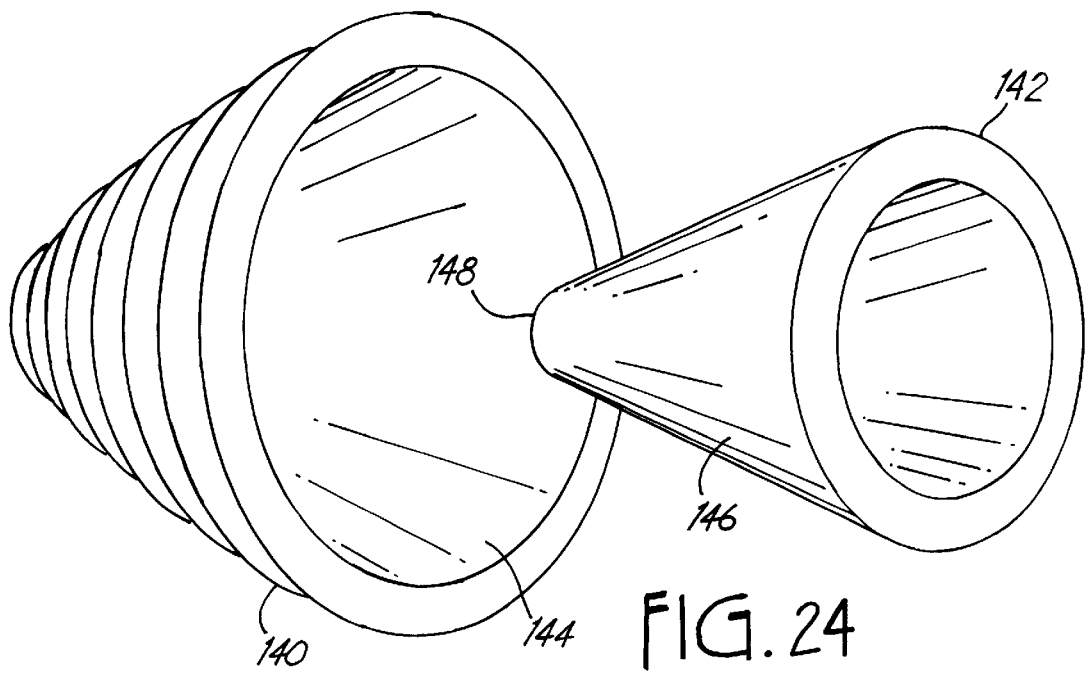
FIGS. 23 and 24 are a perspective view and assembly view, respectively, of a twelfth embodiment of the present invention.
Figure 23:
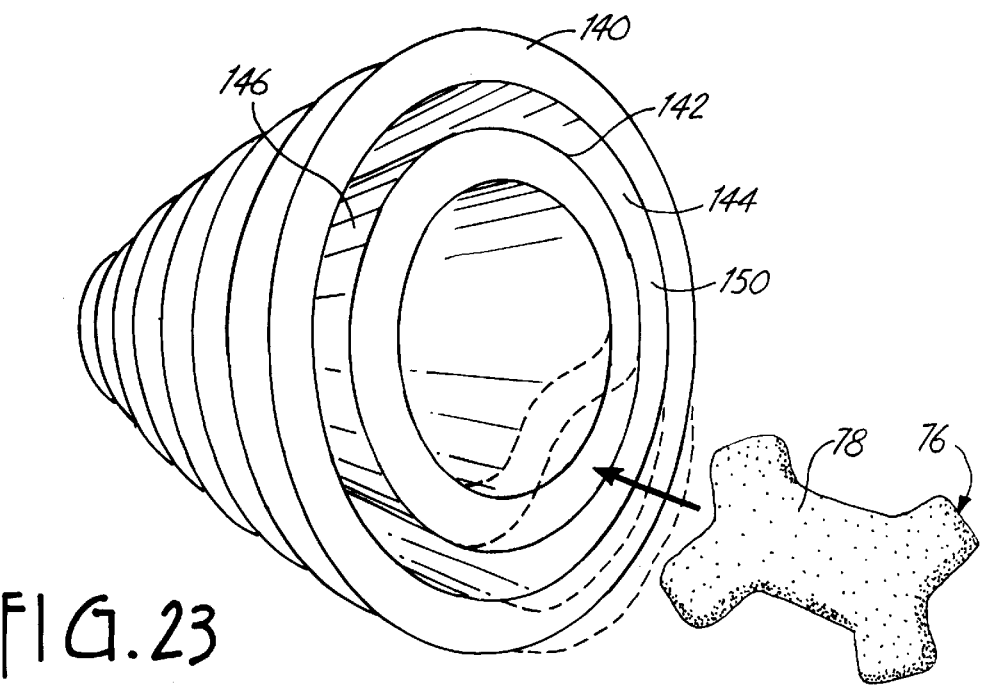

FIGS. 23 and 24 illustrate a twelfth embodiment of the present invention employing a pair of nested concentric conical resilient members 140 and 142. Member 140 has internal conical surface 144, whereas member 142 has an external conical surface 146. The apex 148 of conical member 142 is fastened by a suitable adhesive to the apex of an internal portion of conical member 140 so the two conical members are substantially co-axial to form a conical trapper cavity 150 between surface 144 of member 140 and surface 146 of member 142. Deformation of one or the other, or both, of members 140 and 142, as illustrated in dashed lines, permits easy insertion of attractant 76 into trapper cavity 150 so that a substantial portion of opposite surfaces 78 of attractant 76 are held clamped against surfaces 144 and 146.

Figure 25:
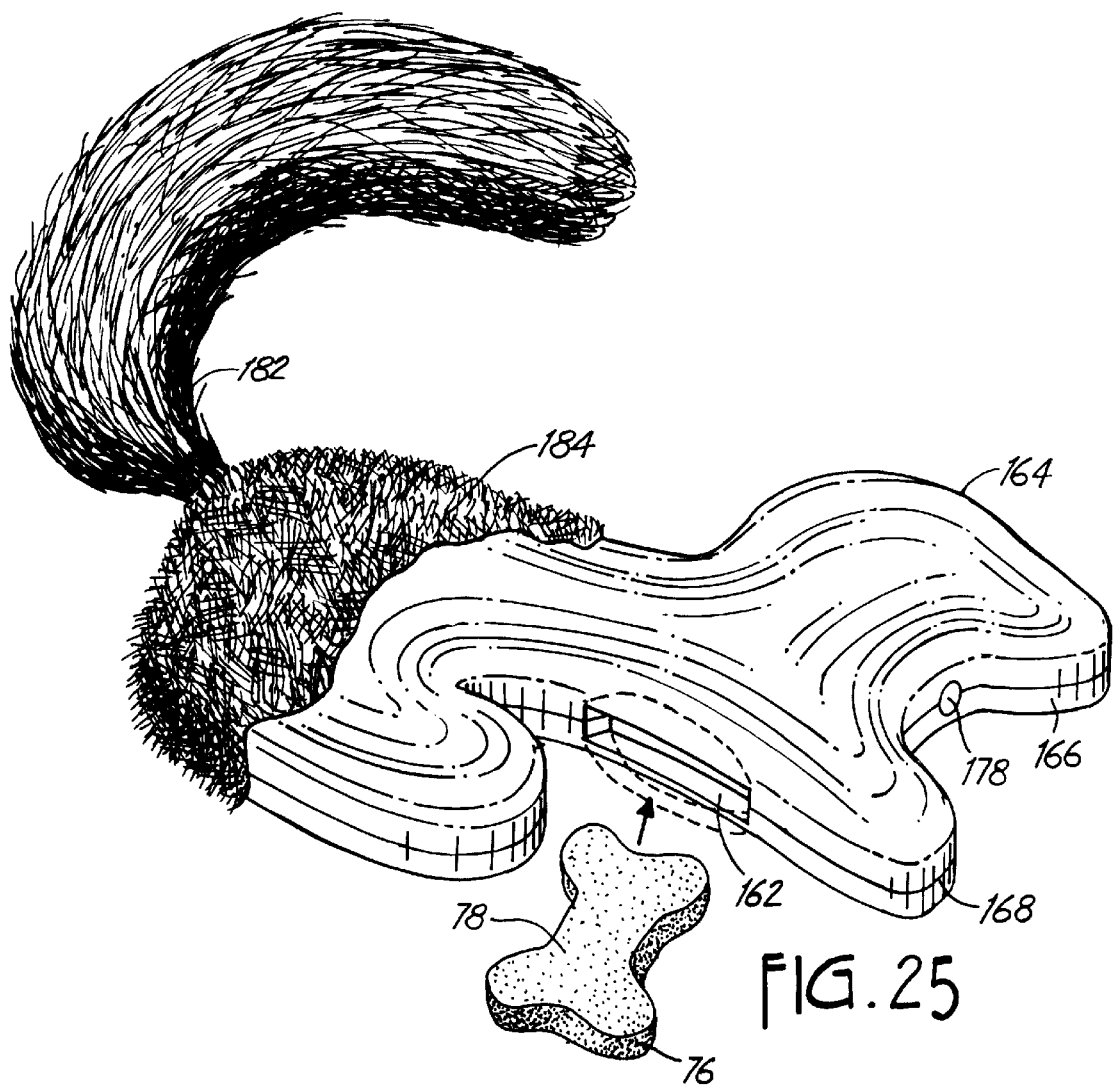
FIGS. 25 and 26 are a perspective view and assembly view, respectively, of a thirteenth embodiment of the present invention.
Figure 26:
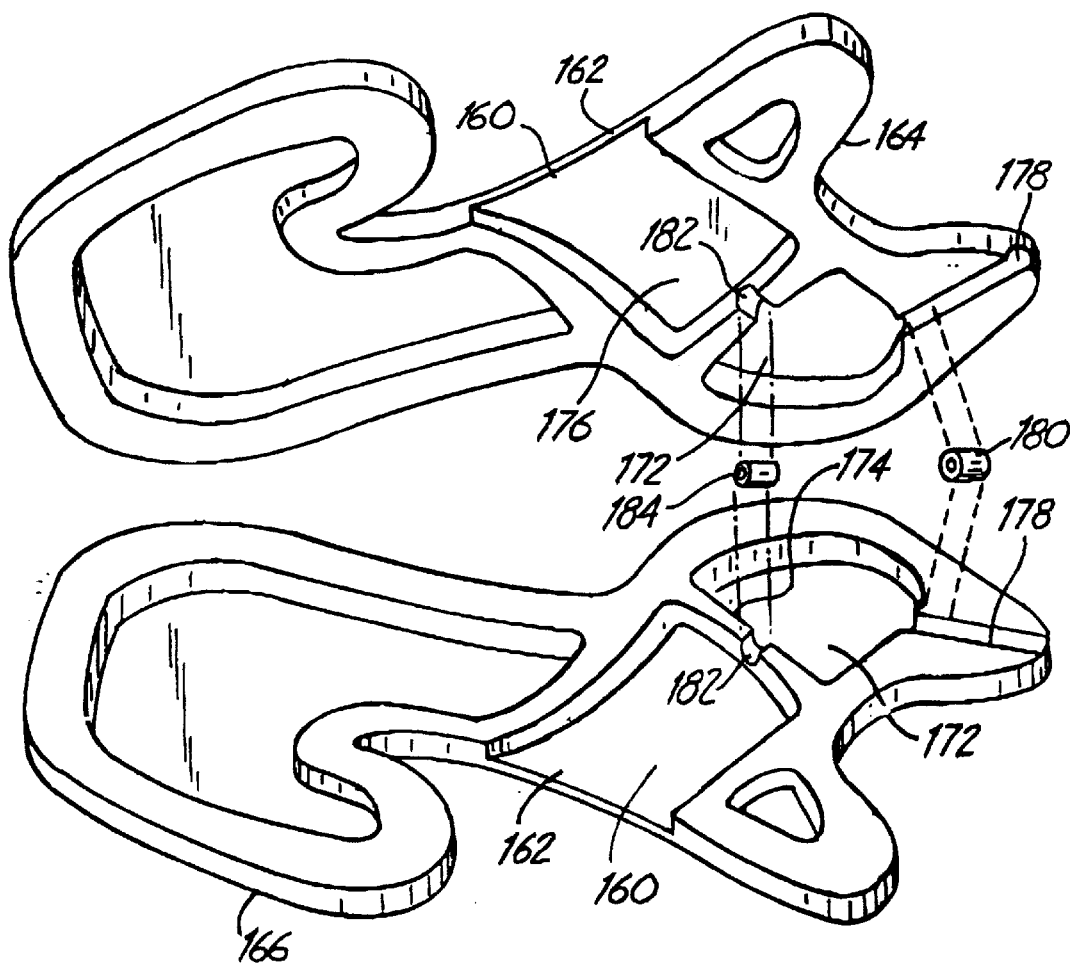

FIGS. 25 and 26 illustrate a thirteenth embodiment of the present invention in which the toy resembles an animal, in this case a squirrel, and includes a trapper cavity 160 having an opening 162 in a peripheral wall of the toy. Resilient members 164 and 166 are fastened together with an adhesive 168. In this case, internal walls 170 divide the assembled toy into trapper cavity 160 and one or more chambers 172. Trapper cavity 160 is sized so that opposing walls 176 of cavity 160 engage and clamp against substantial portions of opposite surfaces 78 of attractant 76 to hold the attractant in the cavity. The peripheral wall of the toy includes opening 162 to trapper cavity 160 to permit insertion of the attractant 76. One chamber 172, separate from the attractant-retaining trapper cavity 160, is a squeaker chamber formed by members 164 and 166 that includes a slot 178 in which a squeaker or other suitable noise-producing member 180 may be placed and sealed to the body with adhesive 168. Trapper cavity 160, squeaker chamber 172 and slot 178 are formed between body members 164 and 166, and squeaker 180 in slot 178 is sandwiched between the body members. To complete the illusion of that the toy illustrated in FIGS. 25 and 26 is animal, such as a squirrel, a tail 182 may be added and the entire body may be covered with a fur-like material 184.

As shown particularly in FIG. 26, squeaker 180 is recessed from the outer surface of the toy in slot 178 so that the animal can not chew the squeaker loose from the toy. Thus, the length of slot 178 is at least twice, and preferably, three times the length of squeaker 180 and squeaker 180 is mounted in slot 178 at or near the entrance to chamber 172 so that the squeaker is recessed from the outer surface of the toy by a distance at least as great as its length, and preferably as much as twice its length. Alternatively, squeaker-retaining slot 182 may be formed between squeaker chamber 172 and trapper cavity 160 so that squeaker 184 may be placed in slot 182, out of reach by the animal. Placement of the squeaker between the squeaker chamber and the trapper cavity places the squeaker in close proximity to the treat in the trapper cavity, so the animal is attracted to that region of the toy by both the treat and the squeaker.

Squeaker chamber 172 is a sealed chamber such that air may be introduced or expelled from chamber 172 only through the squeaker. Chamber 172 is collapsible due to deformation of the body of the toy at the squeaker chamber to expel air from chamber 172 through squeaker 180 and slot 178 to the outside of the toy, or through squeaker 182 and slot 184 to trapper cavity 160 and the outside of the toy. In either case, squeaker chamber 172 is expandable to its nominal size upon subsequent relaxation of the body to its normal shape to draw air into the squeaker chamber through the squeaker and slot. Hence, each time the animal bites on the body at the squeaker chamber, or releases it, air passes through the squeaker producing a noise.

Figure 27:
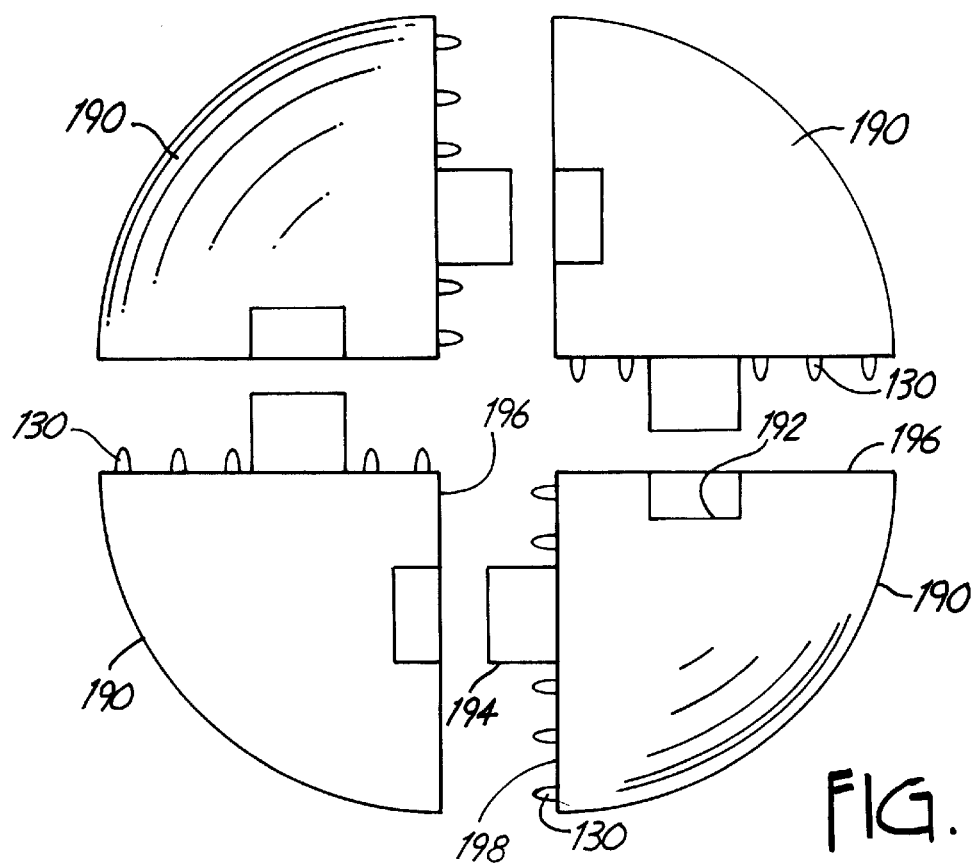
FIGS. 27–29 are assembly and perspective views of a fourteenth embodiment of the present invention.
Figure 28:
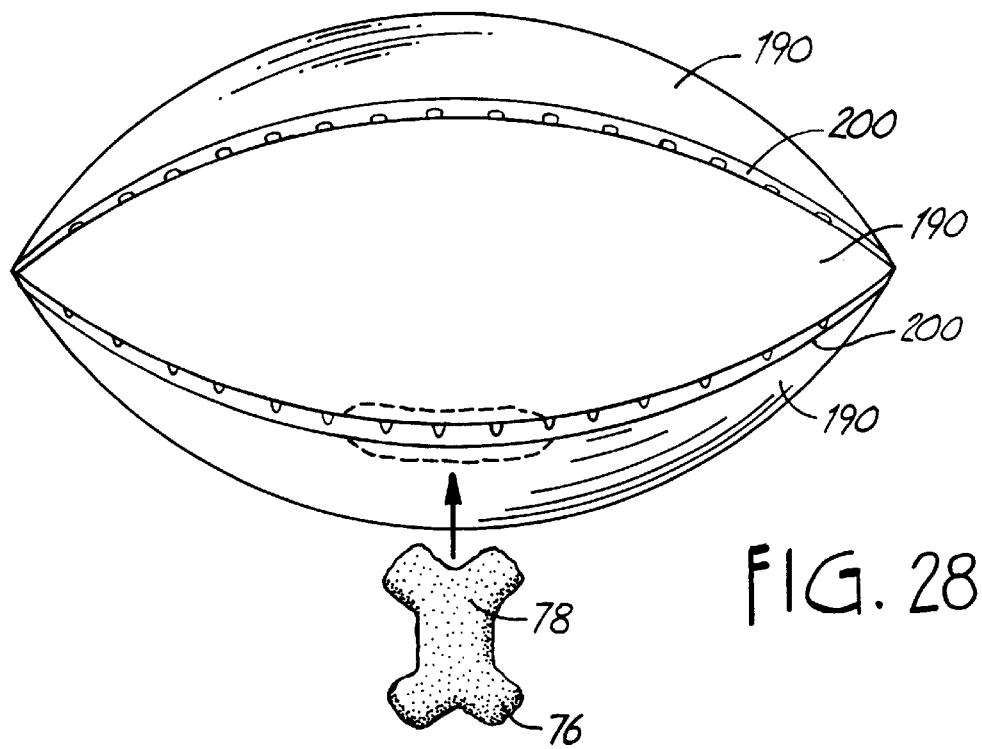
Figure 29:
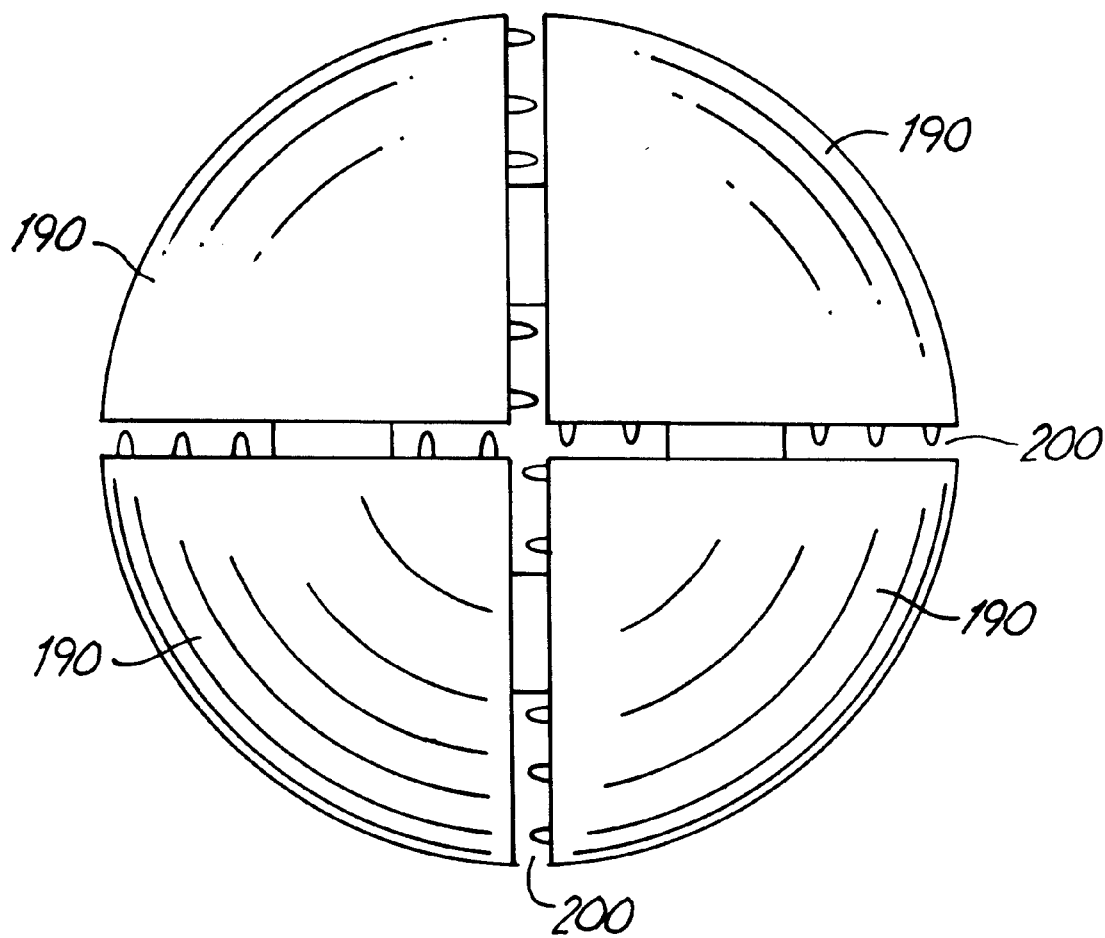

FIGS. 27–29 illustrate a fourteenth embodiment of the present invention in which the toy, generally in the shape of a football, includes four portions 190. Each portion 190 includes a cavity 192 in surface 196 and a cylindrical protrusion 194 in surface 198. Optionally, gripping teeth 130 may extend from one or the other, or both, of surfaces 198 and 196. When four portions 190 are assembled by attaching an adhering cylindrical portion 194 to cavity 192, slots 200 are formed between confronting surfaces 196 and 198 to retain biscuit 76.

One feature of the embodiment illustrated in FIGS. 27–29 is that a single mold may make all four portions 190 of the toy. Additionally, each portion may have a different color, or alternate portions may display alternate colors, such as the colors of a favorite sports team. Additionally, while the embodiment illustrated in FIGS. 27–29 is generally in the shape of a North American football, the toy may be any desired shape, including spherical.

One feature of the embodiments illustrated in FIGS. 11–29 is that the toy may be constructed in various shapes permitted by plural molding of separate resilient members.

The separate members of each toy may be formed of a suitable elastimer or other resilient material, and be dyed different colors. In each case of the embodiments of FIGS. 1–16 and 19–26, the attractant, such as a biscuit or the like, may be retained and clamped in the attractant-receiving trapper cavity over a substantial portion of the opposing surfaces 78 of the attractant. Preferably, the treat-retaining trapper cavity is designed to clamp the attractant to engage at least about one-half of the length of ordinary biscuits, such as MilkBone® biscuits. In some cases, however, the owner or handler may choose to insert a lesser portion of the attractant. In other cases, particularly with the embodiments of FIGS. 11–16, 19–22 and 27–29, the owner or handler may chose to insert the attractant side-ways so that the attractant is fully engaged along a longitudinal edge, rather than an end. The embodiment of FIGS. 17 and 18 provides a treat-retaining trapper cavity 122 that retains even small pieces of the attractant due to the relatively close meshing of teeth 120 closing the cavity. Hence, the animal must break or dissolve the attractant into fine pieces to retrieve the attractant from the cavity.

In each case, the toy according to the present invention releases the attractant over a long period of time, thereby holding the interest of the animal. Additionally, since the attractant can be inserted with minimum difficulty, the toy is easy to use without breaking the attractant.

Although the present invention has been described with reference to preferred embodiments, workers skilled in the art will recognize that changes may be made in form and detail without departing from the spirit and scope of the invention.

What is claimed is:

1. A molded non-consumable pet toy comprising:
    a three-dimensional body formed of resilient material, the body having an outer surface;
    a trapper cavity in the body, at least one opening in the outer surface to the trapper cavity, the trapper cavity having first and second opposing surfaces defining an attractant-retaining space within the body, at least one of the first and second surfaces being a surface of a bias wall so that the attractant-retaining space is smaller than a thickness of an animal attractant when the bias wall is in a relaxed condition, whereby a deforming force applied to the bias wall deforms the bias wall to expand the attractant-retaining space and permit insertion of an attractant into the trapper cavity, and upon release of the deforming force the bias wall clamps at least a portion of the inserted attractant between the first and second surfaces.

2. The pet toy of claim 1, wherein the trapper cavity has a width defined by the first and second surfaces that is greater than a width of an attractant and a depth into the body that is at least half a length of the attractant.

3. The pet toy of claim 1, including
    a bias cavity in the body adjacent the trapper cavity, the bias wall is between the bias cavity and trapper cavity so the bias wall can distort into the bias cavity during insertion of the attractant.

4. The pet toy of claim 1, wherein the bias wall is between the outer surface and the trapper cavity so that the bias wall can distort the outer surface of the toy during insertion of the attractant.

5. The pet toy of claim 4, wherein the body comprises:
    a first resilient body member having a first bias wall, the first opposing surface being a surface of the first bias wall, and
    a second resilient body member having a second bias wall, the second opposing surface being a surface of the second bias wall,
    the first and second body members being joined together so that the first and second opposing surfaces define the trapper cavity between the first and second members.

6. The pet toy of claim 5, wherein the first body member includes a first fastening member and the second body member includes a second fastening member, the first and second fastening members being joined together to form the body.

7. The pet toy of claim 6, wherein the body has a generally circular periphery and the first and second fastening members are centrally positioned on the first and second body members so that the trapper cavity surrounds the joined first second fastening members.

8. The pet toy of claim 7, wherein the first and second body members have a generally frustoconical shape to form the body with an increasing axial thickness of the first and second bias walls from the periphery to the first and second fastening members.

9. The pet toy of claim 6, wherein the first body member includes a plurality of first fastening members joined to respective ones of a plurality of second fastening members on the second body member, the joined first and second fastening members being spaced about the periphery of the body to generally surround the trapper cavity.

10. The pet toy of claim 6, further including a plurality of retaining teeth extending from the first and second surfaces in the trapper cavity to grip an attractant in the trapper cavity.

11. The pet toy of claim 5, wherein the first and second body members each have a generally conical shape and are nested and joined at their respective apexes so that the trapper cavity is formed between the nested first and second members.

12. The pet toy of claim 5, wherein the body has a shape generally resembling an animal body, and a material covering the toy body resembling an animal skin.

13. The pet toy of claim 5, including:
    a squeaker chamber formed between the first and second body members and separate from the trapper cavity,
    a slot open to the outside of the body and extending to the squeaker chamber, and
    a squeaker mounted in the slot.

14. The pet toy of claim 13, wherein the slot extends between the outer surface of the body and the squeaker chamber and has a length that is long compared to a length of the squeaker, and the squeaker is mounted in the slot adjacent the squeaker chamber.

15. The pet toy of claim 13, wherein the slot extends between the squeaker chamber and the trapper cavity.

16. A non-consumable pet toy having
    a body having first and second opposite walls and a perimeter;
    a trapper cavity formed between the first and second walls and sized to completely receive an attractant;
    an opening through the perimeter of the body into the trapper cavity; and
    a plurality of resilient first gates extending from the first wall in the opening and a plurality of resilient second gates extending from the second wall in the opening to mesh with the first gates to substantially close the opening, the first and second gates being sufficiently resilient to permit insertion of an attractant past the gates and into the trapper cavity to retain the attractant in the cavity.

17. The pet toy of claim 16, wherein the body comprises:

a first body member forming the first wall and the first gates, a second body member forming the second wall and the second gates, the first and second body members being joined together so that the first and second walls define the trapper cavity between the first and second members.

* * * * *